United States Patent
Son

(10) Patent No.: US 9,246,179 B2
(45) Date of Patent: Jan. 26, 2016

(54) FUEL CELL SYSTEM AND METHOD OF OPERATING THE SAME

(71) Applicant: Hyundai Motor Company, Seoul (KR)

(72) Inventor: Ik Jae Son, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 240 days.

(21) Appl. No.: 14/100,956

(22) Filed: Dec. 9, 2013

(65) Prior Publication Data

US 2015/0010838 A1 Jan. 8, 2015

(30) Foreign Application Priority Data

Jul. 8, 2013 (KR) ........................ 10-2013-0079530

(51) Int. Cl.
*H01M 8/04* (2006.01)
*G05B 15/02* (2006.01)
*H01M 8/10* (2006.01)

(52) U.S. Cl.
CPC ................. *H01M 8/04* (2013.01); *G05B 15/02* (2013.01); *H01M 8/0432* (2013.01); *H01M 8/04179* (2013.01); *H01M 8/04231* (2013.01); *H01M 8/04365* (2013.01); *H01M 8/04388* (2013.01); *H01M 8/04447* (2013.01); *H01M 8/04746* (2013.01); *H01M 8/04761* (2013.01); *H01M 8/04798* (2013.01); *H01M 8/04253* (2013.01); *H01M 8/04753* (2013.01); *H01M 8/04955* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 2003/0228504 A1* | 12/2003 | Konrad | ............... | B60L 11/1885 429/412 |
| 2007/0009772 A1* | 1/2007 | Iio | ..................... | H01M 8/04097 429/414 |
| 2010/0143809 A1* | 6/2010 | Perry | ................ | H01M 8/04097 429/415 |

FOREIGN PATENT DOCUMENTS

| | | |
|---|---|---|
| JP | 2002-241106 A | 8/2002 |
| JP | 2003-243020 A | 8/2003 |
| JP | 2006-059741 A | 3/2006 |
| JP | 2006-310187 A | 11/2006 |
| JP | 2008-166218 A | 7/2008 |
| KR | 10-2007-0043549 A | 4/2007 |
| KR | 10-2007-0117007 A | 12/2007 |
| KR | 10-2011-0062627 A | 6/2011 |
| KR | 10-2013-0028454 A | 3/2013 |

\* cited by examiner

*Primary Examiner* — Patrick Ryan
*Assistant Examiner* — Wyatt McConnell
(74) *Attorney, Agent, or Firm* — Mintz Levin Cohn Ferris Glovsky and Popeo, P.C.; Peter F. Corless

(57) ABSTRACT

A fuel cell system and a method of operating the same. The fuel cell system in particular includes an air discharge part provided on the anode of a fuel cell, and a controller that is configured to measure a purging period of recirculated hydrogen and an operating temperature of the fuel cell, and operate the air discharge part based on the measured values to prevent the anode from becoming poisoned due to the emission of CO gases.

20 Claims, 6 Drawing Sheets

| WEIGHT | AIR BLEEDING DETERMINATION VARIABLES | | |
|---|---|---|---|
| | OPERATING TEMPERATURE | HYDROGEN PURGE PERIOD | HYDROGEN PURGE TIME |
| 4 | 30°C OR BELOW | ABOVE 12∗ A C | BELOW 1.0∗ a sec |
| 3 | 30~50°C | 8∗ A ~ 12∗ A C | 1.0∗ a ~ 1.5∗ a sec |
| 2 | 50~70°C | 2∗ A ~ 8∗ A C | 1.5∗ a ~ 2.0∗ a sec |
| 1 | ABOVE 70°C | BELOW 2∗ A C | ABOVE 2.0∗ a sec |

Fig. 3

FUEL CELL SYSTEM AND METHOD OF OPERATING THE SAME

CROSS REFERENCE TO RELATED APPLICATION

This application claims priority of Korean Patent Application Number 10-2013-0079530 filed on Jul. 8, 2013, the entire contents of which application are incorporated herein for all purposes by this reference.

BACKGROUND

1. Technical Field

The present invention relates to a fuel cell system and a method of operating the same capable of preventing an increase in a carbon monoxide (CO) concentration and CO poisoning on an anode in a hydrogen side recirculation system when fuel starvation occurs on the hydrogen side during operation of a fuel cell vehicle.

2. Description of the Related Art

During operation of a fuel cell, fuel-starvation may occur on the hydrogen side of the system if the hydrogen concentration is reduced, thus resulting in the production of CO gases. This means that there is a higher probability that CO poisoning of an electrode catalyst on the hydrogen side of the system may occur.

In a fuel cell system, hydrogen distribution is locally deteriorated when a channel is blocked due to moisture which is diffused in the reverse direction on the cathode during operation. As a result, fuel-starvation occurs on the hydrogen side of the system, thereby creating a higher probability that CO is generated on the anode.

These CO gases poison the catalyst and thus result in the deterioration of the general performance of a fuel cell. When the hydrogen concentration is reduced on the anode, the electrode on the hydrogen side is CO-poisoned, so that the stack performance of the fuel cell gradually deteriorates. Therefore, there is a need for a technology that removes CO-poisoning on the hydrogen side and recovers the stack performance by performing air-bleeding toward the hydrogen side during an idle-stop interval or a shut-down interval of a fuel cell vehicle for the purpose of recovering the stack performance of the fuel cell.

The matters described as the related art have been provided only for facilitating the understanding of the background of the present invention and should not be construed as acknowledging it as the prior art already known to those skilled in the art.

SUMMARY

An object of the present invention is to provide a fuel cell system and a method of operating the same capable of preventing an increase in CO concentration and CO poisoning on the anode in a hydrogen side recirculation system when fuel starvation occurs on the hydrogen side during operation of a fuel cell vehicle.

According to an exemplary embodiment of the present invention, there is provided a fuel cell system, including: an air discharge part provided on an anode of a fuel cell; and a controller configured to measure purging degrees of recirculated hydrogen and an operating temperature of the fuel cell and operate the air discharge part based on values measured by the controller to prevent the anode from being poisoned by CO gases. The air discharge part may be provided in a hydrogen circulation line or more specifically, in a hydrogen inflow manifold.

The controller may increasingly operate the air discharge part as the purging of recirculated hydrogen is decreased and/or the operating temperature of the fuel cell decreases.

The controller may also be configured to calculate weights based on the purging period and purging time of recirculated hydrogen and the operating temperature of the fuel cell, and operate the air discharge part when the weight exceeds the operating period of the air discharge part. In doing so, the controller may calculate weights during a corresponding period at every hydrogen purging cycle, may sum the calculated weights with previously calculated weights, and may operate the air discharge part when the accumulated (summed) weights exceed a particular value for a particular operating period.

Alternatively, the controller may calculate the weights based on the hydrogen purging cycle, the purging times and an average operating temperature of the fuel cell at every hydrogen purging period. The hydrogen purging cycle in some exemplary embodiments of the present invention may be the amount of charges generated by the fuel cell.

Upon calculating the weights, the controller, if the accumulated weights exceed the particular value for the operating period, may operate the air discharge part when the fuel cell is idle-stopped or shut down, and may initialize the accumulated weights.

In yet a further exemplary embodiment of the present invention, the controller may calculate weights based on the purging period and purging time of hydrogen and the operating temperature of the fuel cell during the corresponding interval regularly, may sum the calculated weights with previous calculated weights, and may operate the air discharge part if the accumulated weights exceed a particular value during the operating period of the air discharge part. In this case, the controller may calculate the weights based on an average hydrogen purging period, a hydrogen purging time, and an average operating temperature of the fuel cell during the corresponding interval regularly.

As such, the controller may operate the air discharge part when the fuel cell is idle-stopped, and/or when the fuel cell is shut down.

The controller may operate the air discharge part when the fuel cell is idle-stopped, and operate the air discharge part if the fuel cell is shut down without idle stop.

According to an exemplary embodiment of the present invention, there is provided a method of operating the fuel cell system, including: measuring, by a controller, the purging period and purging time of recirculated hydrogen and the operating temperature of a fuel cell; calculating, by the controller, weights based on values measured by the controller to compare the weights calculated by the controller with the operating period of the air discharge part; and operating the air discharge part when the weights reach the operating period of the air discharge part and the fuel cell is idle stopped.

The method may further include, after the operating step, operating the air discharge part when the fuel cell is shut down if the weight reaches a particular value during the operating period of the air discharge part but the vehicle is not idle-stopped.

Additionally, comparing, by the controller, may include: calculating weights based on the purging period and purging time of hydrogen and the operating temperature of the fuel cell during the corresponding interval at every hydrogen purging period; summing the weight calculated by the controller with previous weights; and comparing the accumulated weights with a particular value for the operating period of the air discharge part.

The comparing may include: calculating weights based on the purging period and purging time of hydrogen and the operating temperature of the fuel cell during the corresponding interval regularly; summing the weight calculated by the controller with previously calculated weights; and comparing the accumulated weights with a particular value associated with the operating period of the air discharge part.

BRIEF DESCRIPTION OF THE DRAWINGS

FIG. 3 is a weight table of a fuel cell system according to an exemplary embodiment of the present invention;

DESCRIPTION OF THE EXEMPLARY EMBODIMENTS

Hereinafter, a fuel cell system and a method thereof according to embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
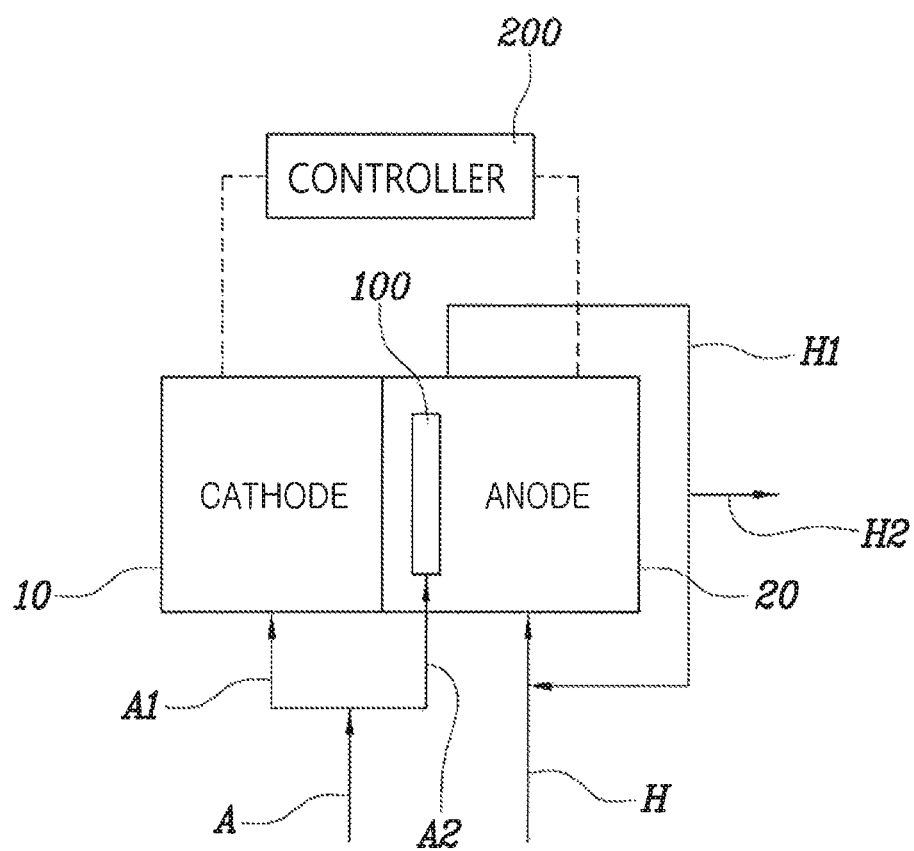
FIG. 1 is a block diagram of a fuel cell system according to an exemplary embodiment of the present invention.
Figure 2:
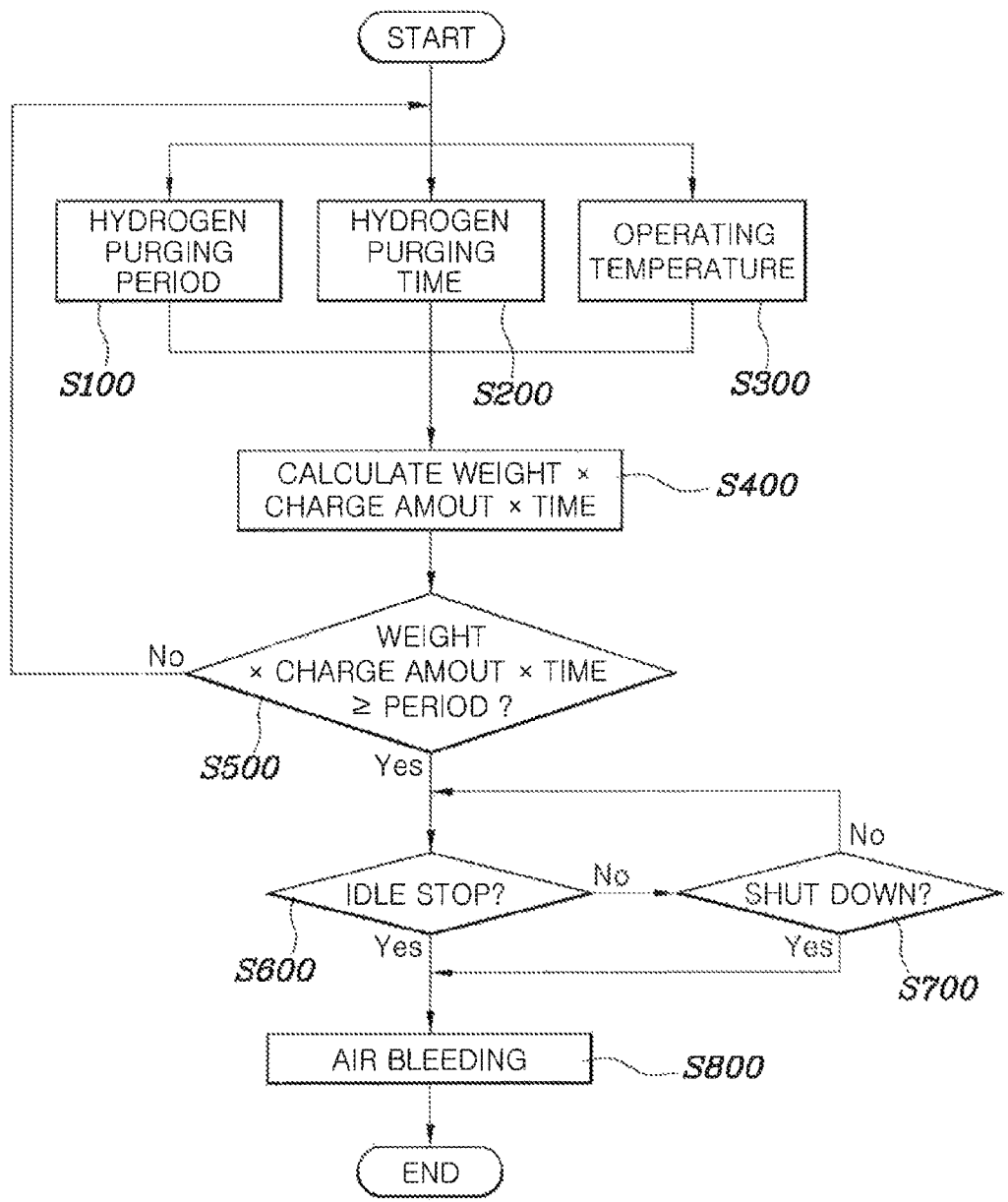
FIG. 2 is a flowchart illustrating a method of operating a fuel cell system according to an exemplary embodiment of the present invention.
Figure 4:
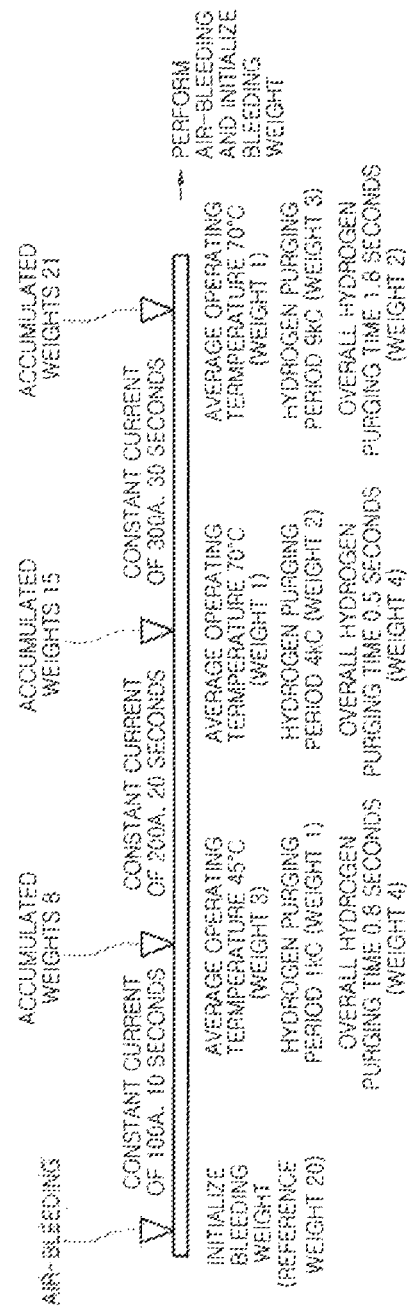
FIGS. 4 and 5 are diagrams for illustrating a method of operating a fuel cell system according to various exemplary embodiments of the present invention.
Figure 5:
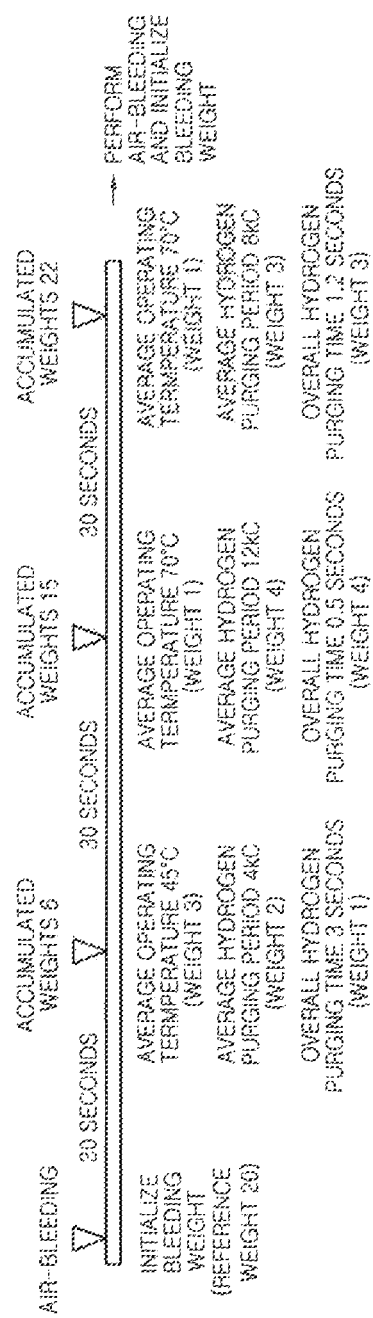
Figure 6:
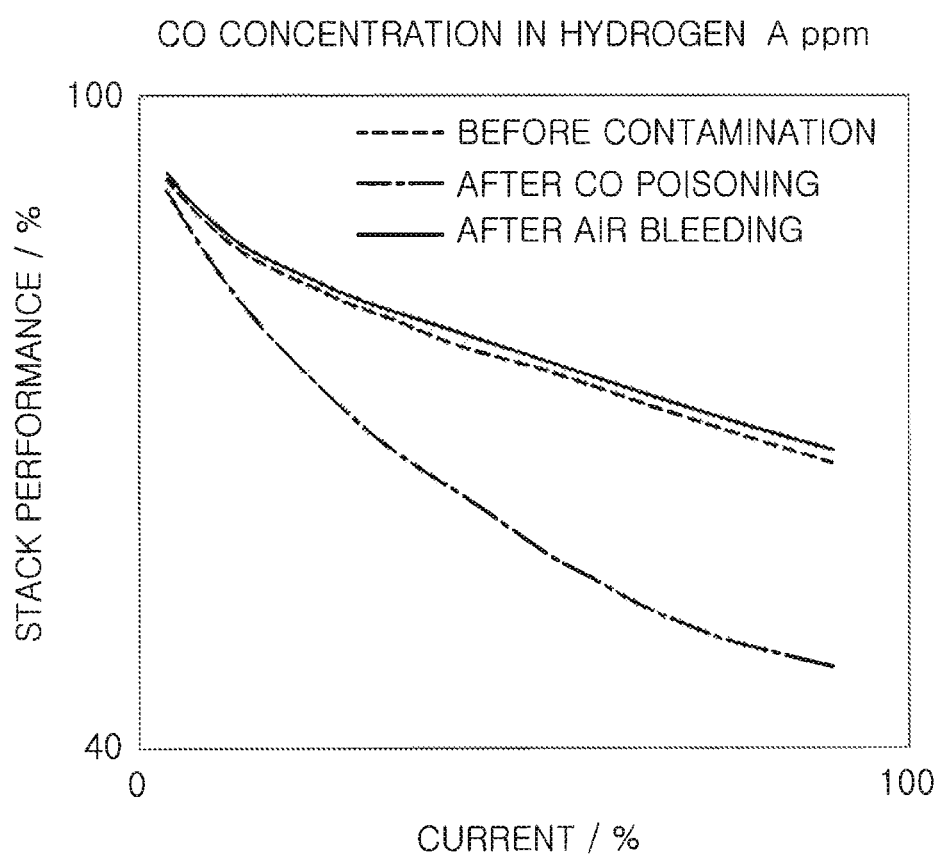
FIG. 6 is a graph showing the effects of a fuel cell system according to an exemplary embodiment of the present invention.

FIG. 1 is a diagram showing a fuel cell system according to an exemplary embodiment of the present invention, FIG. 2 is a flowchart illustrating a method of operating a fuel cell system according to an exemplary embodiment of the present invention, FIG. 3 is a weight table of a fuel cell system according to an exemplary embodiment of the present invention; FIGS. 4 and 5 are diagrams for illustrating a method of operating a fuel cell system according to various exemplary embodiments of the present invention; and FIG. 6 is a graph showing the effects of a fuel system according to an exemplary embodiment of the present invention.

FIG. 1 shows a fuel cell system according to an exemplary embodiment of the present invention, in which the fuel cell system includes an air discharge part provided on an anode of a fuel cell; and a controller that is configured to measure purging cycles of recirculated hydrogen and an operating temperature of the fuel cell and operate the air discharge part based on the measured values to reduce or prevent poisoning of the anode.

At cold start and low temperature-operation times, there is a higher probability of fuel-starvation due to a channel block by frozen moisture or condensed water on the hydrogen side. In addition, when the hydrogen purging period is extended or purging time is shortened for the purpose of improving a hydrogen utilization rate and fuel efficiency, there is a higher probability of fuel-starvation due to an increased nitrogen concentration on the hydrogen side.

Accordingly, CO is heavily produced on the anode due to lack of hydrogen. As a result the catalyst becomes poisoned/damaged by and then the stack performance deteriorates. This is why it is important to blow air into the anode in order to convert CO into carbon dioxide ($CO_2$). This process is often referred to as air-bleeding in order to recover stack performance.

Therefore, during an idle-stop interval or shut-down interval of the fuel cell vehicle, air-bleeding is periodically performed so that CO contaminants on the hydrogen side are removed by the CO reduction reaction and thus the stack performance may be recovered. Further, as shown in FIG. 3, the period and duration of air-bleeding may be determined based on, for example, operating temperature T, hydrogen purging period Q, and hydrogen purging time t.

Specifically, variables in calculating weights may include an operating temperature of a fuel cell, a hydrogen purging period, and/or a hydrogen purging time. The hydrogen purging period is determined based on the charge amount calculated by operating a fuel cell. For example, if 2000 C is considered depending on operating conditions, hydrogen purging is performed when the charge amount reaches 2000 C by integrating currents and times.

The controller may calculate weights based on the purging period and purging time of recirculated hydrogen and the operating temperature of the fuel cell, and operate the air discharge part when the weights exceed a particular value for a given operating period of the air discharge part.

For example, the controller may calculate weights during a corresponding interval at every hydrogen purging period, may sum the calculated weights with previously calculated weights, and may operate the air discharge part when the accumulated weights exceed a particular value for the given the operating period. That is, in this case, weights are calculated at every hydrogen purging period, and the weights calculated at every hydrogen purging period are summed accordingly.

In this case, the controller may calculate the weights based on a hydrogen purging period/cycle and purging time and an average operating temperature of the fuel cell at every hydrogen purging period. Further, if the accumulated weights exceed a particular value for the given operating period, the controller operates the air discharge part when the fuel cell is idle-stopped or shut down, and re-initializes the accumulated weights calculation.

For another example, the controller may calculate weights based on the purging period/cycle and purging time of hydrogen and the operating temperature of the fuel cell during the corresponding interval regularly, may sum the calculated weights with previously calculated weights, and may operate the air discharge part when the accumulated weights exceed a particular value for a given operating period of the air discharge part. In this case, the weights are calculated regularly and consistently, and are not synchronized with the hydrogen purging period.

Accordingly, in this case, the controller may calculate the weights based on an average hydrogen purging period, a hydrogen purging time, and an average operating temperature of the fuel cell in the corresponding interval regularly. Then, the calculated weights are summed and accumulated to be compared to a particular value for the operating period.

FIGS. 4 and 5 illustrate the sequence thereof in detail. FIG. 4 illustrates the case where weights are calculated at every hydrogen purging period and summed, in which the weight calculation is initialized when air is discharged. Weights are calculated at the hydrogen purging period, i.e., 1 k C (1000 C). In this case, as shown in the table in FIG. 3, the weight in the corresponding interval is calculated as 8. Weights are calculated and summed in the same manner in the later intervals. When the accumulated weights exceed the particular value of the operating period of (e.g., 20 and reach 21), air is discharged at the time of idle-stop or shut down.

FIG. 5 illustrates the case where weights are calculated regularly, e.g., at every 30 seconds, in which weights are calculated by substituting an average operating temperature, an average hydrogen purging period, and a hydrogen purging time during the corresponding interval in the table in FIG. 3. Likewise, the accumulated weights are compared with the operating period to perform air discharge, and then the accumulated weights calculation is re-initialized.

Specifically, a fuel cell system according to an embodiment of the present invention includes an air discharge part 100 provided on the anode of the fuel cell, in which an air inflow line A is branched as a line A1 blowing air into the cathode 10 and a line A2 blowing air into the anode.

The air discharge part 100 may be provided in a hydrogen circulation line, which includes a line H via which hydrogen flows in thereto or a line H1 via which hydrogen recirculates therein, and CO is exhausted being reduced to $CO_2$ by blowing air into the existing hydrogen circulation line, to prevent poisoning of the catalyst.

Typically, a hydrogen inflow manifold H is disposed on the anode for inflow of hydrogen. In the embodiment shown in FIG. 1, the air discharge part 100, which is a separate mechanical component, is provided for blowing air into the anode 20 as necessary. With this, CO is exhausted by being reduced to $CO_2$, thereby preventing the poisoning. If the air discharge part 100 is provided in the hydrogen inflow manifold, it exhibits the maximum effect since air is directly blown into the anode.

To this end, the controller 200 measures the purging period/cycle of recirculated hydrogen H1 and the operating temperature of a fuel cell, and operates the air discharge part 100 based on the measured values to cancel the CO poisoning of the anode. Specifically, the controller may increasingly operate the air discharge part 100 as the purging H2 of the recirculated hydrogen H1 is reduced. That is, fuel efficiency is increased by recirculating the used hydrogen back to the anode, some of which is purged H2 in order to be mixed with discharged air and exhausted outside of the system. Accordingly, as the purging amount of the recirculated hydrogen is reduced, the concentration of hydrogen newly provided into the anode is lowered due to nitrogen, vapor or the like included in the recirculated hydrogen, such that lack of hydrogen occurs and accordingly CO is overly generated to poison the catalyst.

Therefore, since CO poisoning occurs more frequently when the purging of hydrogen is weaker, the poisoning is prevented by increasingly operating the air discharge part as the purging of hydrogen is reduced.

Moreover, the controller 200 may increasingly operate the air discharge part 100 as the operating temperature of a fuel cell is lowered. This is because that more moisture is generated on the anode at lower operational temperatures of a fuel cell and thus there is a higher probability of the poisoning. In order to prevent poisoning, the air discharge part is operated more frequently at lower temperatures (e.g., below 0° C.).

Accordingly, the controller 200 may calculate weights based on the purging period and purging time of recirculated hydrogen and the operating temperature of the fuel cell, and operate the air discharge part when the weights exceed the operating period of the air discharge part 100. The calculating of weights and the operating time of the air discharge part are the same as in the embodiment described above, and thus a further detailed description is omitted to avoid repetition.

As shown in the table in FIG. 3, the purging period and purging time of the hydrogen and the operating temperature of the fuel cell are divided into intervals each with a score (grade), and the scores are summed. When the sum of the weights exceeds a particular value associated with a given operating period, air is blown into the anode. Further, for the hydrogen purging periods, the actually measured charge amount may be multiplied by the value of A to be compared with the table. For the purging times, the value of A may be multiplied by a tuning factor to be quantified, and then may be determined accordingly.

Meanwhile, if air is blown into the anode while it is operating, the performance of a fuel cell may drastically deteriorate or other side effects may occur. Accordingly, the controller 200 should preferably operate the air discharge part when a fuel cell is idle-stopped. That is, the controller operates the air discharge part 100 as soon as the weights exceed the particular value associated with the operating period and the fuel cell is idle-stopped, to prevent poisoning of the catalyst. As such, the controller 200 may operate the air discharge part once the fuel cell is shut down.

That is, the controller 200 operates the air discharge part only when the fuel cell is idle-stopped in most instances, but when the particular value is exceeded while the vehicle is running, the controller may operates the air discharge part later on when the vehicle is eventually shutdown. By doing so, it may be possible to prepare a later operation.

FIG. 2 is a flowchart illustrating a method of operating a fuel cell system according to an embodiment of the present invention. The method includes measuring, by the controller a period of hydrogen purging, a time of the purging and an operating temperature of the fuel cell system (S100, S200, S300); calculating, by the controller, weights based on the values measured by the controller (i.e., a period of hydrogen purging, a time of the purging and an operating temperature of the fuel cell system) (S400); comparing, by the controller, the weight with a particular value for an operating period of the air discharge part (S500); and operating, by the controller, the air discharge part when the weight reaches the particular value for the operating period and the fuel cell is idle-stopped (S800).

The method may further include, after the operating step, operating the air discharge part when the fuel cell is shut down when the weights reach the particular value during the operation period but is not yet idle or stopped (S700).

More specifically, in the above method, at first, the purging period and time of the hydrogen are measured, and the operating temperature of the fuel cell is measured (S100, S200, S300). Then, the measured values are summed to calculate weights (S400), and the sum of the weights is compared with the particular value for the operating period (S500). If the weights exceed the operating period (S600), air-bleeding is performed during idle stop (S800), and if the fuel cell is shut down without idle stop (S700), air-bleeding is performed during the shutdown (S800).

Further, as described above with respect to the two embodiments, in the comparing (S500), weights may be calculated based on the hydrogen purging periods, the purging times, and the operating temperature of a fuel cell during the corresponding interval at every hydrogen purging period and may be summed up with previously calculated weights, and the accumulated weights may be compared with the particular value for a given operating period.

Alternatively, during the comparison (S500), the controller may calculate weights based on the purging period/cycle and purging time of hydrogen and the operating temperature of the fuel cell during the corresponding interval regularly and may sum the calculated weight with previously calculated weights, and the accumulated weights may be compared with the operating period of the air discharge part.

FIG. 6 is a graph showing the effects of the fuel cell system according to the embodiment of the present invention, from which it can be seen that the efficiency of the fuel cell after reducing the amount of CO gases compared to that before contamination, and the efficiency of the fuel cell after air-bleeding that the illustrative embodiment of the present invention is able to recover the fuel cell back to or better than its previous efficiency before contamination.

Advantageously, according to the fuel cell system and the method thus configured, the condition of the fuel cell can be optimally maintained by performing air-bleeding relatively accurately even without the use of a separate hydrogen concentration sensor or a CO sensor.

Although the present invention has been described with reference to particular embodiments, it will be obvious to one skilled in the art that various changes and modifications can be made to the present invention without departing from the scope of the present invention defined in the appended claims.

What is claimed is:

1. A fuel cell system, comprising:
   an air discharge part provided on an anode of a fuel cell; and
   a controller configured to measure a purging period of recirculated hydrogen and an operating temperature of the fuel cell, and operate the air discharge part based on the measured purging period and the operating temperature to prevent the anode from being poisoned.

2. The system according to claim 1, wherein the air discharge part is provided in a hydrogen circulation line.

3. The system according to claim 1, wherein the air discharge part is provided in a hydrogen inflow manifold.

4. The system according to claim 1, wherein the controller operates the air discharge part more frequently as the purging of recirculated hydrogen is decreased.

5. The system according to claim 1, wherein the controller operates the air discharge part more frequently as the operating temperature of the fuel cell is lowered.

6. The system according to claim 1, the controller calculates weights based on the purging period and a purging time of recirculated hydrogen and on the operating temperature of the fuel cell, and operates the air discharge part when the weights exceed a particular value associated with an operating period of the air discharge part.

7. The system according to claim 6, wherein the controller calculates weights during a corresponding period at every hydrogen purging period, sums the calculated weights with previously calculated weights, and operates the air discharge part when the summed weights exceed the particular value associated with the operating period.

8. The system according to claim 7, wherein the controller calculates the weights based on the hydrogen purging periods, the purging times and an average operating temperature of the fuel cell at every hydrogen purging period.

9. The system according to claim 6, wherein the hydrogen purging period is an amount of charges generated by the fuel cell.

10. The system according to claim 6, wherein the controller, when the summed weights exceed the particular value associated with the operating period, operates the air discharge part when the fuel cell is idle-stopped or shut down, and re-initializes a summed weights calculation.

11. The system according to claim 6, wherein the controller calculates weights based on the purging period and purging time of hydrogen and the operating temperature of the fuel cell during the corresponding interval regularly, sums the calculated weights with previously calculated weights and operates the air discharge part when the summed weights exceed a particular value the operating period of the air discharge part.

12. The system according to claim 7, wherein the controller calculates the weights based on an average hydrogen purging period, a hydrogen purging time, and an average operating temperature of the fuel cell during the corresponding interval regularly.

13. The system according to claim 1, wherein the controller operates the air discharge part when the fuel cell is idle-stopped.

14. The system according to claim 1, wherein the controller operates the air discharge part when the fuel cell is shut down.

15. The system according to claim 1, wherein the controller operates the air discharge part when the fuel cell is idle-stopped, and operates the air discharge part once the fuel cell is shut down.

16. A method of operating the fuel cell system according to claim 1, the method comprising:
   measuring, by a controller, a purging period and a purging time of recirculated hydrogen and an operating temperature of a fuel cell;

calculating, by the controller, weights based on the purging period and the purging time of recirculated hydrogen and the operating temperature of the fuel cell to compare the calculated weights with a particular value associated with an operating period of the air discharge part; and
operating the air discharge part when the weights reach the particular value associated with the operating period of the air discharge part and the fuel cell is idle stopped.

17. The method according to claim 16, further comprising, waiting to operate the air discharge part until the fuel cell is shut down when the weights reach the particular value associated with the operating period of the air discharge part but the fuel cell is not idle-stopped.

18. The method according to claim 16, wherein the comparing includes:
    calculating weights based on the purging period and purging time of hydrogen and the operating temperature of the fuel cell during the corresponding interval at every hydrogen purging period;
    summing the calculated weight with previously calculated weights; and
    comparing the summed weights with the particular value associated with the operating period of the air discharge part.

19. The method according to claim 16, wherein the comparing includes:
    calculating weights based on the purging period and purging time of hydrogen and the operating temperature of the fuel cell during the corresponding interval regularly;
    summing the calculated weight with previously calculated weights; and
    comparing the summed weights with the particular value associated with the operating period of the air discharge part.

20. A non-transitory computer readable medium containing program instructions executed by a processor within a controller for operating the fuel cell system according to claim 1, the computer readable medium comprising:
    program instructions that measure the purging period and the purging time of recirculated hydrogen and the operating temperature of the fuel cell;
    program instructions that calculate weights based on the purging period and the purging time of recirculated hydrogen and the operating temperature of the fuel cell to compare the calculated weights with a particular value associated with an operating period of an air discharge part; and
    program instructions that operate the air discharge part when the weights reach the particular value associated with the operating period of the air discharge part and the fuel cell is idle stopped.

* * * * *